US012807445B2

(12) United States Patent
Ahn et al.

(10) Patent No.: US 12,807,445 B2
(45) **Date of Patent: *Nov. 24, 2026**

(54) AUTOMATIC REPLACEMENT APPARATUS AND METHOD FOR FEED MATERIAL

(71) Applicants: SK On Co., Ltd., Seoul (KR); People & Technology, Inc., Gyeongsangbuk-do (KR)

(72) Inventors: Jun Young Ahn, Daejeon (KR); Se Hun Park, Daejeon (KR); Yun Jong Kim, Daejeon (KR); Yong Woon Park, Gyeongsangbuk-do (KR)

(73) Assignees: SK On Co., Ltd., Seoul (KR); People & Technology, Inc., Gyeongsangbuk-do (KR)

( * ) Notice: Subject to any disclaimer, the term of this patent is extended or adjusted under 35 U.S.C. 154(b) by 103 days.

This patent is subject to a terminal disclaimer.

(21) Appl. No.: 18/926,313

(22) Filed: Oct. 25, 2024

(65) Prior Publication Data

US 2025/0042683 A1 Feb. 6, 2025

Related U.S. Application Data

(63) Continuation of application No. 17/680,730, filed on Feb. 25, 2022, now Pat. No. 12,151,911.

(30) Foreign Application Priority Data

Feb. 26, 2021 (KR) ........................ 10-2021-0026249

(51) Int. Cl.
*B65H 19/12* (2006.01)
*B65H 19/10* (2006.01)
(Continued)

(52) U.S. Cl.
CPC ........... *B65H 19/12* (2013.01); *B65H 19/102* (2013.01); *B65H 19/1857* (2013.01);
(Continued)

(58) Field of Classification Search
CPC ...... B65H 19/12; B65H 19/20; B65H 19/102; B65H 19/1857; B65H 2301/4182; B65H 2301/4607; B65H 2301/4622
See application file for complete search history.

(56) References Cited

U.S. PATENT DOCUMENTS 3,645,463 A 2/1972 Helm
3,939,032 A 2/1976 Taitel et al.
(Continued)

FOREIGN PATENT DOCUMENTS

CN 104192607 A 12/2014
CN 105198236 A 12/2015
(Continued)

OTHER PUBLICATIONS

Extended European Search Report for the European Patent Application No. 22159010.2 issued by the European Patent Office on Jul. 21, 2022.

(Continued)

*Primary Examiner* — Sang K Kim
(74) *Attorney, Agent, or Firm* — IP & T GROUP LLP

(57) ABSTRACT

An automatic replacement apparatus for a feed material includes a discharge unit discharging a feed material to the outside, a pair of feed units disposed to be adjacent to the discharge unit and having a feed roll around which the feed material is wound, and a pair of material joint units respectively provided in the pair of feed units connecting a front end of a first feed material waiting in a first feed unit, one of the pair of feed units, and an end of a second feed material
(Continued)

being transferred from a second feed unit, the other of the pair of feed units, to the discharge unit in a butt joint manner.

16 Claims, 12 Drawing Sheets

(51) Int. Cl.
*B65H 19/18* (2006.01)
*B65H 19/20* (2006.01)
*H01M 4/04* (2006.01)

(52) U.S. Cl.
CPC .......... *B65H 19/20* (2013.01); *H01M 4/0435* (2013.01); *B65H 2301/4182* (2013.01)

(56) References Cited

U.S. PATENT DOCUMENTS

| | | | | |
|---|---|---|---|---|
| 4,190,483 | A | 2/1980 | Ryan et al. | |
| 5,679,195 | A | 10/1997 | O'Dwyer et al. | |
| 12,151,911 | B2 * | 11/2024 | Ahn ....................... | B65H 19/12 |
| 2007/0170300 | A1 | 7/2007 | Titz et al. | |
| 2010/0186879 | A1 | 7/2010 | Machamer | |
| 2016/0068361 | A1 | 3/2016 | Machamer | |
| 2016/0159600 | A1 | 6/2016 | Pedercini et al. | |
| 2017/0137247 | A1 | 5/2017 | Sato et al. | |
| 2017/0137248 | A1 | 5/2017 | Sato et al. | |
| 2017/0137251 | A1 | 5/2017 | Sato et al. | |
| 2017/0341894 | A1 | 11/2017 | Muller | |

FOREIGN PATENT DOCUMENTS

| | | | |
|---|---|---|---|
| CN | 107275677 | A | 10/2017 |
| KR | 10-0819183 | B1 | 4/2008 |
| KR | 10-1438929 | B1 | 9/2014 |
| KR | 10-2016-0133264 | A | 11/2016 |
| KR | 10-2018-0069390 | A | 6/2018 |
| KR | 10-1956930 | B1 | 3/2019 |
| KR | 10-2099571 | B1 | 4/2020 |

OTHER PUBLICATIONS

Office Action for U.S. Appl. No. 17/680,730 issued by the USPTO on Apr. 1, 2024.

Office Action for Korean Patent Application No. 10-2021-0026249 issued by the Korean Patent Office on Apr. 23, 2025.

Office Action for Chinese Patent Application No. 202210174311.4 issued by the Chinese Patent Office on Aug. 13, 2025.

* cited by examiner

AUTOMATIC REPLACEMENT APPARATUS AND METHOD FOR FEED MATERIAL

CROSS-REFERENCE TO RELATED APPLICATION(S)

This application is a continuation of U.S. patent application Ser. No. 17/680,730 filed on Feb. 25, 2022, which claims benefit of priority to Korean Patent Application No. 10-2021-0026249 filed on Feb. 26, 2021 in the Korean Intellectual Property Office, the disclosure of which is incorporated herein by reference in its entirety.

BACKGROUND

1. Field

The present disclosure relates to an automatic replacement apparatus and method for a feed material (i.e., an apparatus and method for automatically replacing a feed material).

2. Description of Related Art

As technological development and demand for mobile devices and electric vehicles has increased, demand for secondary battery cells as an energy source has rapidly increased. Secondary battery cells are batteries capable of repeated charging and discharging because mutual conversion between chemical energy and electrical energy is reversible.

Such a secondary battery cell includes an electrode assembly such as a positive electrode, a negative electrode, a separator, and an electrolyte, which are main components of a secondary battery and a cell body member of a laminated film case protecting the electrode assembly.

Here, electrode plates, such as a positive electrode and a negative electrode, are supplied to manufacture the secondary battery cell, and these electrode plates are continuously supplied.

Accordingly, when an electrode material wound on a feed roll is consumed, the feed roll should be replaced with a new feed roll.

However, in the related art, in order to replace the electrode material, an operator has to move a replacement electrode material to a location in which a facility exists and replace an existing electrode material, causing a large amount of work time, and since a production facility is stopped for a great deal of time during a replacement process, productivity is lowered.

Therefore, there is a need for a study on automatic replacement apparatus and method for a feed material to improve the problems or limitations mentioned above.

SUMMARY

An aspect of the present disclosure is to provide an automatic replacement apparatus and method for a feed material, capable of automatically replacing a feed roll supplying a feed material such as an electrode material.

Another aspect of the present disclosure is to provide an automatic replacement apparatus and method for a feed material capable of replacing a feed roll, while minimizing loss of a feed material.

According to an aspect of the present disclosure, an automatic replacement apparatus for a feed material includes a discharge unit discharging a feed material to the outside;

a pair of feed units disposed to be adjacent to the discharge unit and having a feed roll around which the feed material is wound; and a pair of material joint units respectively provided in the pair of feed units connecting a front end of a first feed material waiting in a first feed unit, one of the pair of feed units, and an end of a second feed material being transferred from a second feed unit, the other of the pair of feed units, to the discharge unit in a butt joint manner.

The material joint unit may include: a support block including a front plate allowing the feed material to be disposed thereon and having a plurality of adsorption holes forming negative pressure; a clamp coupled to the front plate, one end of the clamp being hinged to one end of the front plate and the other end of the clamp being rotatably moved and fixed to the other end of the front plate; and a separator accommodated in the front plate, one end of the separator being hinged to a central portion of the front plate and the other end of the separator being rotatably moved in an outward direction to protrude from the front plate.

The separator may separate a front end of the first feed material from the front plate so that a portion of adhesive tape is attached to an inner surface of the front end of the first feed material facing the front plate.

The material joint unit may include a transporter associated with the support block so that the other portion of the adhesive tape is attached to an end of the second feed material, and moving the support block in a direction toward the second feed material.

The front plate may include a first buffer pad provided on an outer surface in contact with the feed material.

The clamp may include a stationary magnet and may be coupled to the front plate formed of a metal material by magnetic force.

The clamp may include a second buffer pad surrounding the stationary magnet.

The material joint unit may include a cutter passing through a hole formed in the front plate, moving in a width direction of the feed material, and cutting the feed material.

The feed unit may include: a support frame allowing the feed roll to be coupled thereto; and a position adjuster allowing the support frame to be coupled thereto and rotatably moving the support frame.

According to another aspect of the present disclosure, an automatic replacement method for a feed material includes: a first taping operation of attaching a portion of adhesive tape to a front end of a first feed material waiting in a first feed unit; a position adjusting operation of moving the first feed unit to be disposed in parallel to a second feed unit; a first cutting operation of cutting a second feed material being transferred from the second feed unit to a discharge unit to form an end of the second feed material; and a second taping operation of moving the first feed unit toward the second feed unit to attach the other remaining portion of the adhesive tape to the end of the second feed material so that the first feed material and the second feed material are connected to each other in a butt joint manner.

The first taping operation may include: a first fixing operation of disposing the first feed material on a support block of the first feed unit and fixing a front end of the first feed material by forming negative pressure in a front plate of the support block; a second fixing operation of fixing a connection portion of the first feed material adjacent to a front end of the first feed material to the front plate by rotatably moving a clamp of the first feed unit; a front end releasing operation of releasing the fixed front end of the first feed material by releasing negative pressure of the front plate; a front end separating operation of separating the front end of the first feed material from the front plate by rotating a portion of a separator of the first feed unit in an outward direction; and a tape attaching operation of attaching a portion of adhesive tape to an inner surface of the front end of the first feed material facing the front plate.

The first taping operation may include a second cutting operation of cutting a portion of the front end of the first feed material to have a length butt-joining an end of the second feed material, the second cutting operation being performed after the first fixing operation or the second fixing operation and before the front end releasing operation.

At least one of the first cutting operation and the second cutting operation may include: a penetrating operation in which the cutter penetrates through a central portion of the feed material; a first cutting and moving operation in which the cutter, in a state of penetrating through the feed material, is moved to one end of the feed material; and a second cutting and moving operation in which the cutter, in a state of penetrating through the feed material, is moved from one end of the feed material to the other end of the feed material.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
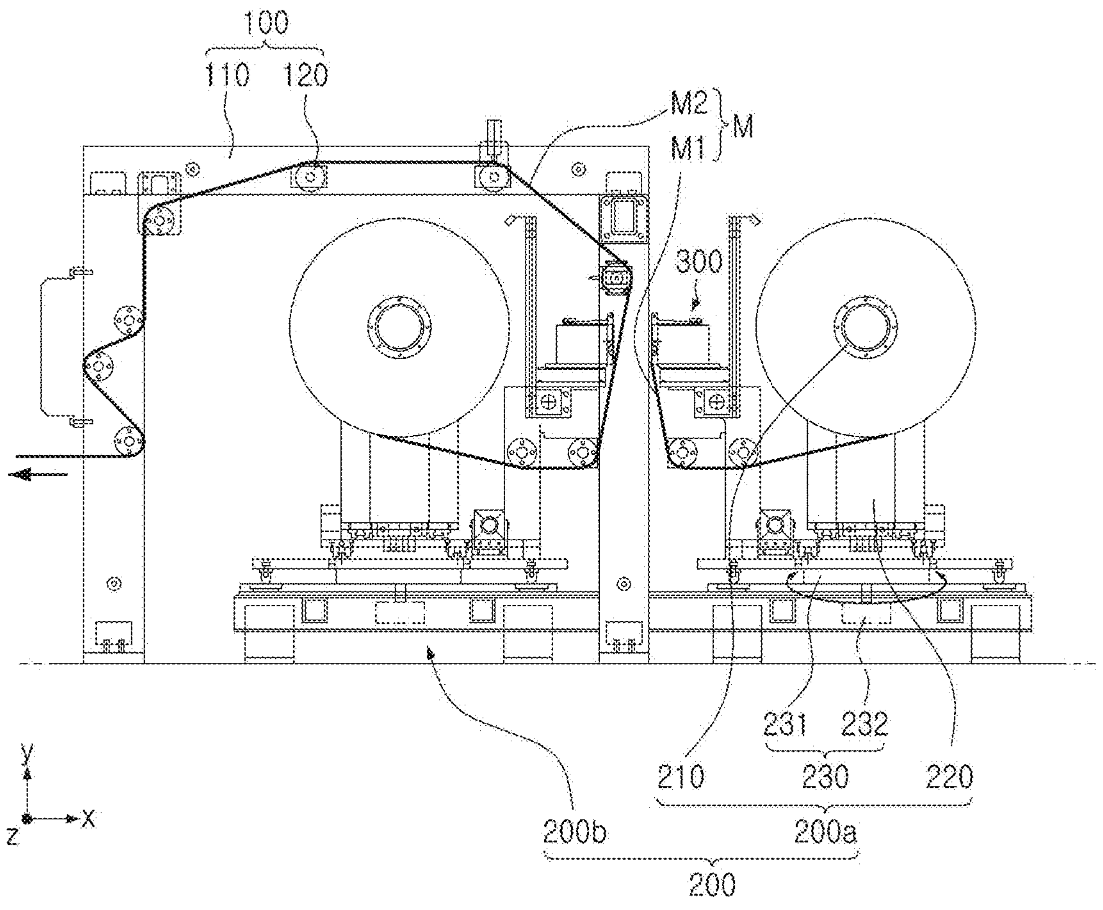
FIG. 1 is a side view illustrating an automatic replacement apparatus according to an exemplary embodiment in the present disclosure.

The present disclosure will be described in detail below with reference to the accompanying drawings. Repeated descriptions and descriptions of known functions and configurations that have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated to make the description clearer.

Also, in the present disclosure, singular expressions may include plural expression unless the context clearly states otherwise, and throughout the specification, like reference numerals or reference numerals given in a similar manner refer to the like element or corresponding elements.

An apparatus and method for automatically replacing a feed material M may replace the feed material M such as an electrode material for producing an electrode plate or a current collector material for producing a current collector.

That is, the apparatus and method for automatically replacing a feed material M of the present disclosure may automatically perform replacement of an electrode material for manufacturing a secondary battery cell, while minimizing loss of the feed material M.

In addition, the apparatus and method for automatically replacing a feed material M of the present disclosure may replace the feed material M, while minimizing a thickness variation that may occur as a material to be replaced is coupled to a material being supplied during replacement of the feed material M in an overlapping manner.

Here, the secondary battery cell may include an electrode assembly including positive and negative electrode plates and a cell body member surrounding the electrode assembly. The cell body member may include an accommodation portion accommodating the electrode assembly and a sealing portion sealing a periphery of the accommodation portion.

The electrode assembly substantially includes an electrolyte and is accommodated in a cell body member together. The electrolyte may include lithium salts such as $LiPF_6$ and $LiBF_4$ in an organic solvent such as ethylene carbonate (EC), propylene carbonate (PC), diethyl carbonate (DEC), ethyl methyl carbonate (EMC), dimethyl carbonate (DMC), etc. Furthermore, the electrolyte may be in a liquid, solid or gel phase.

Also, as a component for protecting the electrode assembly and accommodating the electrolyte, for example, the cell body member may be provided as a pouch-type member or a can-type member. Here, the pouch-type member is a type to accommodate the electrode assembly by sealing the electrode assembly on three sides and four sides, and three sides of an upper surface portion and both side surface portions, excluding one surface portion, which is mainly a lower surface portion, are folded and bonded with the electrode assembly accommodated therein, and sealed. Also, the can-type member is a member configured to seal and accommodate the electrode assembly from one surface, and is mainly configured to seal one surface of, mainly, an upper surface portion with the electrode assembly accommodated therein.

However, the pouch-type secondary battery cell and the can-type secondary battery cell are only examples of produced secondary battery cells, but are not limited thereto.

Figure 2:
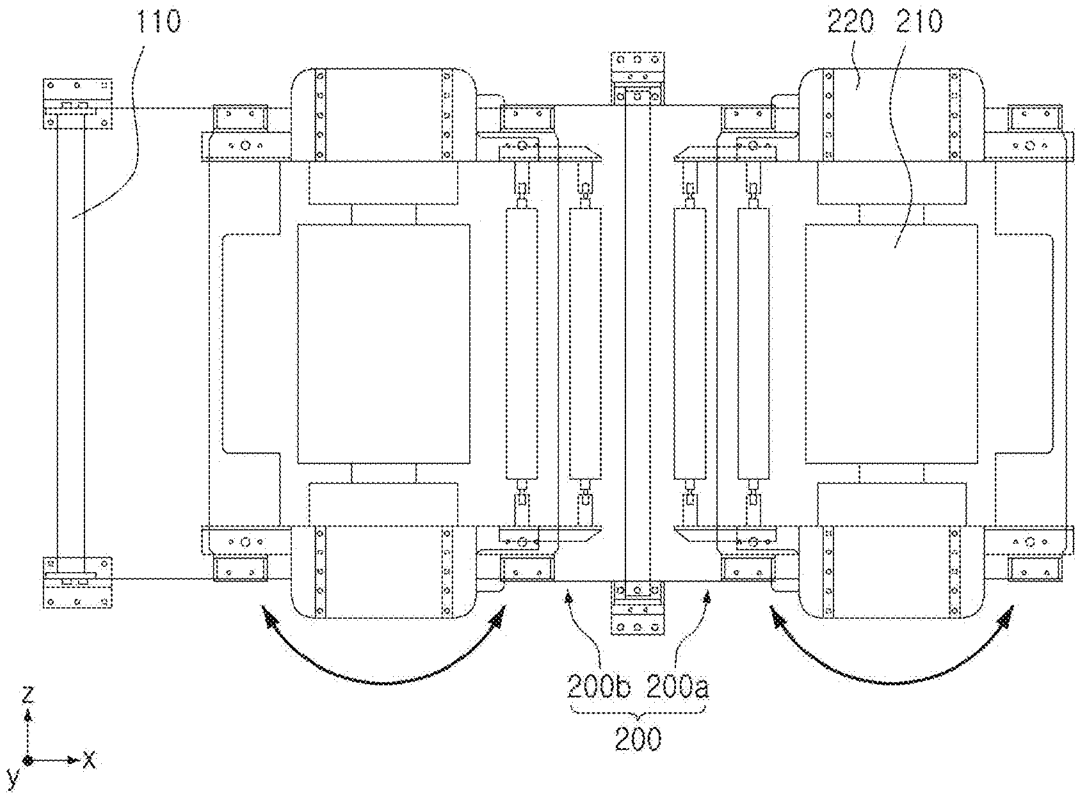
FIG. 2 is a plan view illustrating a feed unit of an automatic replacement apparatus according to an exemplary embodiment in the present disclosure.

FIG. 1 is a side view illustrating an apparatus for automatically replacing the feed material M according to an exemplary embodiment in the present disclosure, and FIG. 2 is a plan view illustrating a feed unit 200 of the apparatus for automatically replacing the feed material M according to an exemplary embodiment in the present disclosure.

Referring to FIGS. 1 and 2, the apparatus for automatically replacing a feed material M according to an exemplary embodiment in the present disclosure may include a discharge unit 100, a pair of feed units 200, and a pair of material joint units 300.

Here, the discharge unit 100 may serve to discharge the feed material M externally. That is, the discharge unit 100 receives the feed material M from the feed unit 200 and delivers the feed material M to a manufacturing process that requires the feed material M. For example, the feed material M may be sent to a process for manufacturing an electrode plate or a current collector by the discharge unit 100.

To this end, the discharge unit 100 may include a body frame 110 and a guide roll portion 120. The body frame 110 serves as a body supporting the feed material M to move. That is, the guide roll portion 120, the feed unit 200, the material joint unit 300, etc. may be coupled to the body frame 110. And the guide roll portion 120 is coupled to the body frame 110 to serve to guide movement of the feed material M. To this end, the guide roll portion 120 may be provided in the form of a rotating roller. As an example, the guide roll portion 120 may refer to a component disposed at an inflection point at which a path of the feed material M changes, as shown in FIG. 1.

A pair of the feed units 200 may include a feed roll 210 disposed to be adjacent to the discharge unit 100 allowing the feed material M to be wound therearound. That is, the feed unit 200 serves to provide the feed material M. To this end, the feed unit 200 includes the feed roll 210.

The feed roll 210 is provided with the feed material M wound therearound, and as the feed roller 210 is rotated, the feed material M may be unwound therefrom to be delivered to the discharge unit 100.

In addition, the feed unit 200 may include a first feed unit 200*a* including a first feed material M1 waiting for replacement and a second feed unit 200*b* including a second feed material M2 being supplied to the discharge unit 100.

In addition, the feed unit 200 may be configured to rotate in a height direction y for replacement of the feed roll 210. To this end, the feed unit 200 of the apparatus for automatically replacing the feed material M according to an exemplary embodiment in the present disclosure may include a support frame 220 and a position adjuster 230.

The support frame 220 may allow the feed roll 210 to be coupled thereto. That is, the support frame 220 supports the feed roll 210 so that the feed material M is supplied, while the feed roll 210 is rotated.

In addition, the position adjuster 230 may allow the support frame 220 to be coupled thereto, and may serve to rotatably move the support frame 220. That is, the position adjuster 230 may adjust a position of the feed roll 210 by rotating the support frame 220 to which the feed roll 210 is coupled, axially in the height direction y.

As an example, the position adjuster 230 may include a rotating pole 231 coupled to a lower end portion of the support frame 220 and a rotation driving portion 232 for rotating the rotating pole 231. That is, a rotated position of the feed roll 210 may be adjusted by rotating the rotating pole 231 by the rotation driving portion 232. Here, the rotation driving portion 232 may be provided as a motor delivering rotational driving force or a component including a cam converting linear driving into rotational driving and a hydraulic/pneumatic cylinder.

The pair of material joint units 300 may be provided in the pair of feed units 200, respectively, and a front end Mf of the first feed material M1 waiting in the first feed unit 200*a*, one of the pair of feed units 200, and an end Me of the second feed material M2 being delivered to the discharge unit 100 from the second feed unit 200*b*, the other of the pair of feed units 200, may be connected in a butt joint manner.

That is, since the material joint unit 300 connects the first feed material M1 and the second feed material M2, the configuration for delivering the feed material M to the discharge unit 100 is automatically replaced from the second feed unit 200*b* to the first feed unit 200*a*.

Furthermore, since the material joint unit 300 connects the first feed material M1 to the second feed material M2 in a butt joint manner, the feed material M may be replaced, while a thickness variation of the portion in which the first feed material M1 is connected to the second feed material M2 is minimized.

To this end, the material joint unit 300 may include a support block 310, a clamp 320, and a separator 330. Details thereof will be described later with reference to FIG. 3 and the like.

Figure 3:
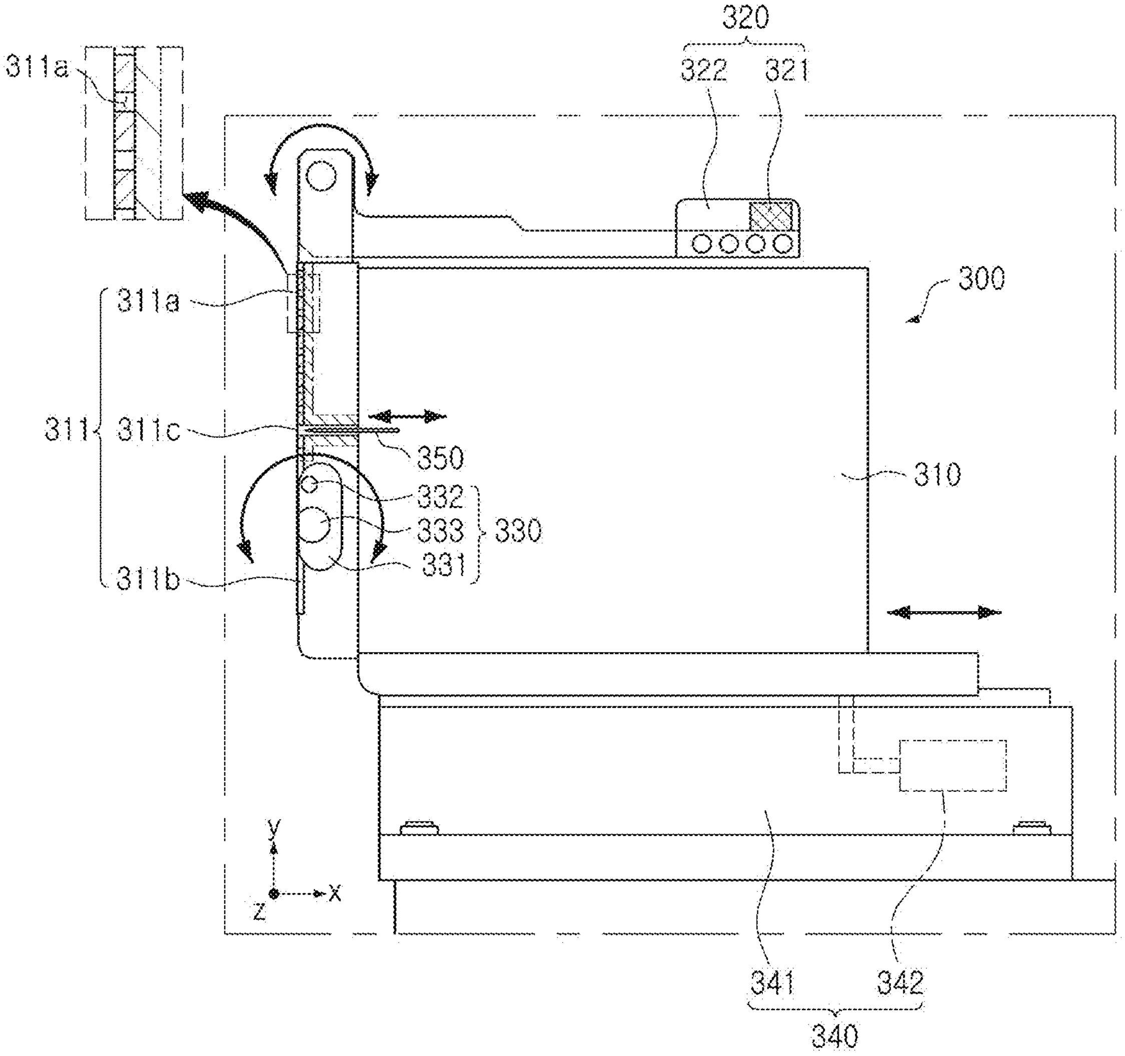
FIG. 3 is a side view illustrating a material joint unit of an automatic replacement apparatus according to an exemplary embodiment in the present disclosure.

FIG. 3 is a side view illustrating the material joint unit 300 of an apparatus for automatically replacing the feed material M according to an exemplary embodiment in the present disclosure.

Figure 4:
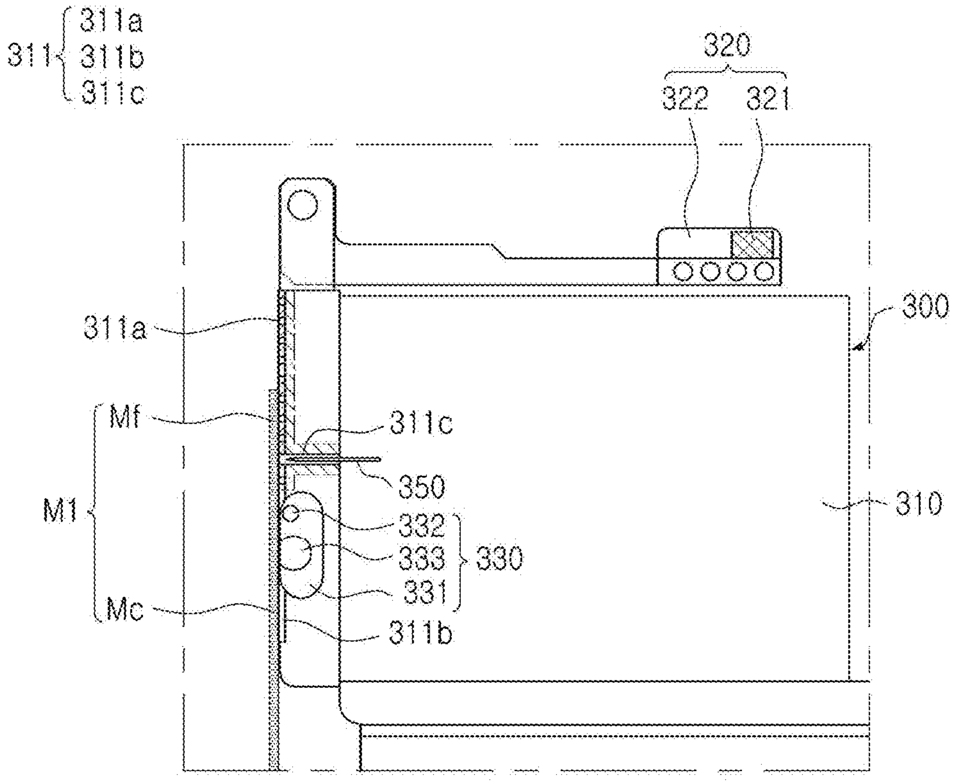
FIGS. 4 to 9 are side views illustrating a process of connecting a front end of a first feed material to an end of a second feed material by a material joint unit of an automatic replacement apparatus of the present disclosure according to an exemplary embodiment.
Figure 9:
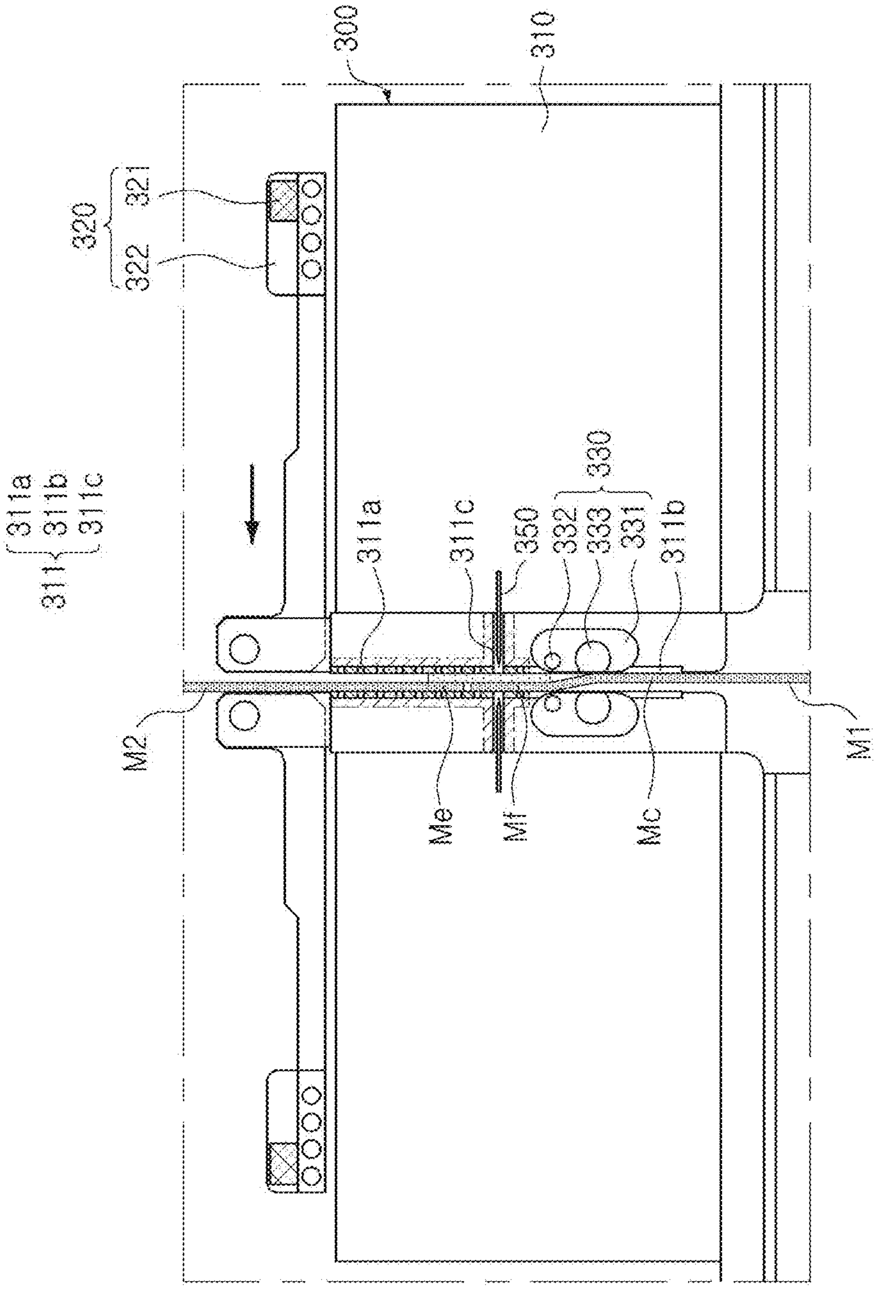

FIG. 4 is a side view illustrating a state in which the first feed material M1 is adsorbed and fixed to the material joint unit 300 provided in the first feed unit 200*a* in the process of connecting the front end Mf of the first feed material M1 and the end M2 of the second feed material M2 by the apparatus for automatically replacing the feed material M according to an exemplary embodiment in the present disclosure, and FIG. 9 is a side view illustrating a state in which the end M2 of the second feed material M2 is attached to adhesive tape T as the material joint unit 300 provided in the first feed unit 200*a* moves in a horizontal direction x in which the material joint unit 300 provided in the second feed unit 200*b* is positioned.

Referring to the drawings, the material joint unit 300 of the apparatus for automatically replacing the feed material M according to an exemplary embodiment in the present disclosure may include the support block 310, the clamp 320, and the separator 330.

Here, the support block 310 may include a front plate 311 on which the feed material M is disposed and a plurality of adsorption holes 311*a* for forming negative pressure are formed. Accordingly, the support block 310 may adsorb and fix the feed material M to an outer surface of the front plate 311 in which the adsorption holes 311*a* are formed. In addition, the support block 310 may include the clamp 320, the separator 330, and the like.

A plurality of adsorption holes 311*a* are provided in the front plate 311 and include an upper adsorption hole 311*a* provided at an upper end portion of the front plate 311, a central adsorption hole 311*a* provided at a central portion of the front plate 311, and a lower adsorption hole 311*a* provided at a lower end portion of the front plate 311, and formation of negative pressure of the adsorption holes 311*a* may be individually controlled.

In addition, the front plate 311 of the apparatus for automatically replacing the feed material M according to an exemplary embodiment in the present disclosure may include a first buffer pad 311*b* on an outer surface thereof in contact with the feed material M. Damage to the feed material M in closed contact with and fixed to the front plate 311 may be prevented by the first buffer pad 311*b*. To this end, the first buffer pad 311*b* may be formed of a material such as rubber, sponge, etc. that is changed in shape and restored to its original shape.

One end of the clamp 320 may be hinged to one end of the front plate 311, and the other end thereof may be rotated and fixed to the other end of the front plate 311. As a result, the clamp 320 may fix the feed material M in close contact with the front plate 311, and furthermore, the feed material M is fixed even when no negative pressure is formed in the front plate 311.

To this end, the clamp 320 may also include a stationary magnet 321 and a second buffer pad 322. Details thereof will be described later with reference to FIG. 6.

In addition, the clamp 320 may allow the separator 330 to pass therethrough so that a portion of the feed material M may be spaced apart from the front plate 311 by the separator 330. As an example, the clamp 320 may be provided as a "C"-shaped frame laid with an open top.

The separator 330 may be accommodated in the front plate 311, and one end thereof may be hinged to the central portion of the front plate 311 and the other end thereof may be rotated outwardly to protrude from the front plate 311.

Here, one end of the separator 330 coupled to the front plate 311 may refer to a complete end of the separator 330, but may also refer to a portion of the separator 330 close to the center of the separator 330.

By the separator 330, a portion of the feed material M fixed to the outer surface of the front plate 311 may be disposed to be spaced apart from the front plate 311. To this end, the separator 330 may include a connection arm 331, a cross bar 332, and a rotating shaft 333. Details thereof will be described later with reference to FIGS. 7 and 8.

In addition, the material joint unit 300 of the apparatus for automatically replacing the feed material M according to an exemplary embodiment in the present disclosure may include a block transfer unit (i.e., a transporter) 340.

The transporter 340 may be connected to the support block 310 to attach a remaining portion of the adhesive tape T to the end Me of the second feed material M2, and may move the support block 310 in a direction x toward the second feed material M2

To this end, the transporter 340 may include a transfer guide portion 341 and a linear driving portion 342. The transfer guide portion 341 may include a rail on which the support block 310 is seated, guiding movement of the support block 310. The linear driving portion 342 may be provided on the transfer guide portion 341 and may be coupled to the support block 310 to linearly move the support block 310 in the horizontal direction x to be adjacent to the second feed material M2. For example, the linear driving portion 342 may be provided as a hydraulic/pneumatic cylinder transferring linear driving force or a configuration including a cam and a motor changing rotational driving into linear driving.

Figure 5:
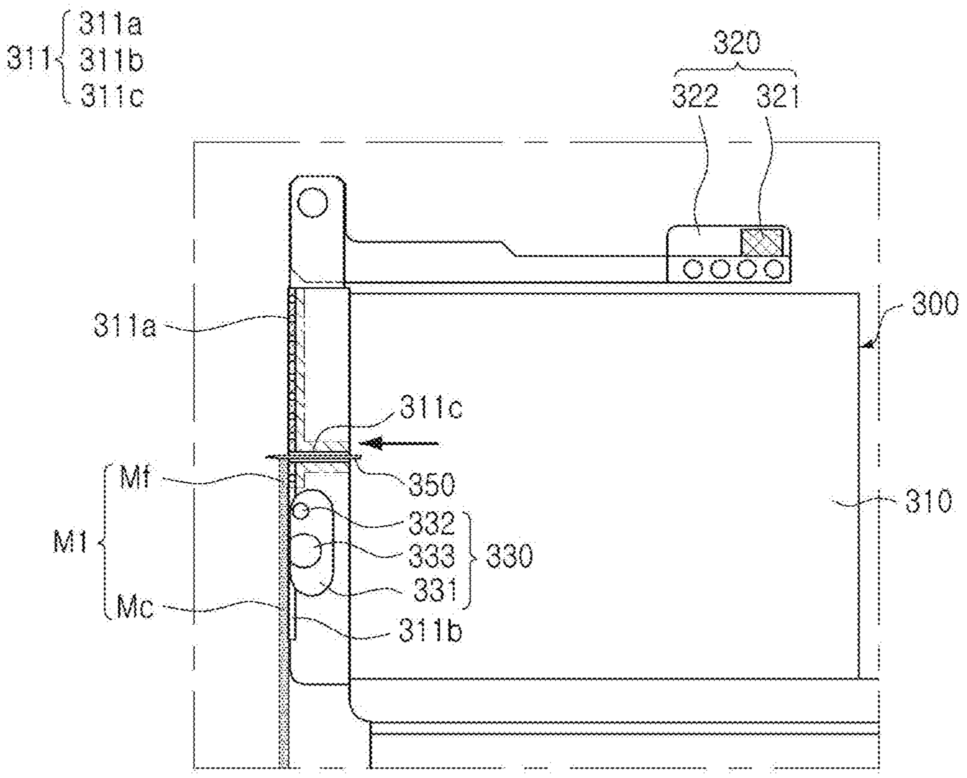

FIG. 5 is a side view illustrating a state in which a portion of the first feed material M1 adsorbed to the material joint unit 300 provided in the first feed unit 200*a* is cut by a cutter 350 in the process of connecting the front end Mf of the first feed material M1 to the end M3 of the second feed material M2 by the material joint unit 300 of the apparatus for automatically replacing the feed material M according to an exemplary embodiment in the present disclosure. FIG. 10A to 10D are plan views illustrating a process of cutting the feed material M by the cutter 350 of the apparatus for automatically replacing the feed material M according to an exemplary embodiment in the present disclosure.

Referring to the drawings, the material joint unit 300 of the according to an exemplary embodiment in the present disclosure according to an exemplary embodiment in the present disclosure may include the cutter 350.

The cutter 350 may penetrate through the hole 311*c* formed in the front plate 311, move in a width direction of the feed material M, and may cut the feed material M.

That is, the cutter 350 cuts a portion of the feed material M so that both sides of the feed materials M may join.

The cutter 350 of the material joint unit 300 provided in the first feed unit 200*a* may cut a portion of the front end Mf of the first feed material M1. Also, the cutter 350 of the material joint unit 300 provided in the second feed unit 200*b* cuts the second feed material M2 to form the end Me of the second feed material M2.

Accordingly, the front end Mf of the first feed material M1 and the end Me of the second feed material M2 may be connected to each other in a butt joint manner.

Also, the cutter 350 protrudes from the hole 311*c* formed in the front plate 311 and moves in the width direction of the feed material M to cut the feed material M. To this end, the hole 311*c* may be formed to be elongated in a length direction z of the front plate 311 which is the width direction of the feed material M. For example, the hole 311*c* may have a slit shape.

Figure 6:
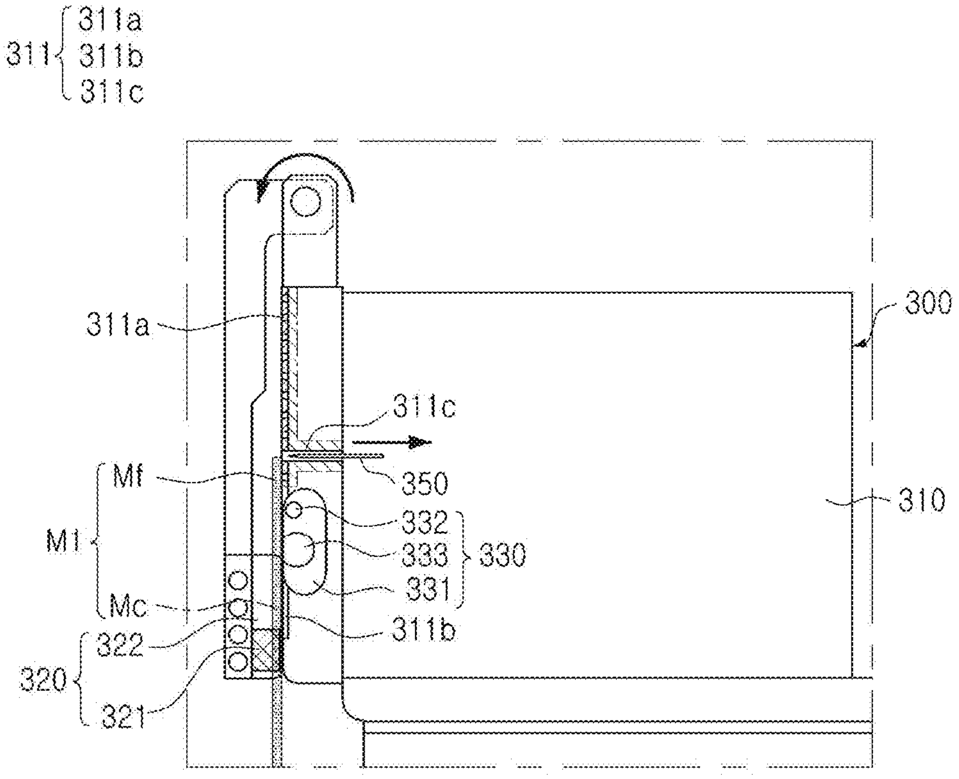

FIG. 6 is a side view illustrating a state in which the clamp 320 is rotatably moved to fix a connection portion Mc of the first feed material M1 to the material joint unit 300 provided in the first feed unit 200*a* in the process of connecting the front end Mf of the first feed material M1 to the end M3 of the second feed material M2 by the material joint unit 300 of the apparatus for automatically replacing the feed material M according to an exemplary embodiment in the present disclosure.

Referring to the drawings, the clamp 320 of the apparatus for automatically replacing the feed material M according to an exemplary embodiment in the present disclosure may be provided with a stationary magnet 321 at the other end thereof to be coupled to the front plate 311 formed of a metal material by magnetism.

That is, since the clamp 320 includes the stationary magnet 321, the clamp 320 may be rotated and fixed to the front plate 311 by magnetism. Accordingly, the feed material M may also be fixed to the front plate 311. To this end, the front plate 311 is also formed of a metal material that is in close contact with by magnetism.

In addition, the clamp 320 of the apparatus for automatically replacing the feed material M according to an exemplary embodiment in the present disclosure may include a second buffer pad 322 surrounding the stationary magnet 321.

By providing the second buffer pad 322, when the clamp 320 is magnetically fixed to the front plate 311, damage to the feed material M positioned on the front plate 311 may be prevented. To this end, the second buffer pad 322 may be formed of a material such as rubber, sponge, etc. that changes in shape and is restored to its original shape.

Figure 7:
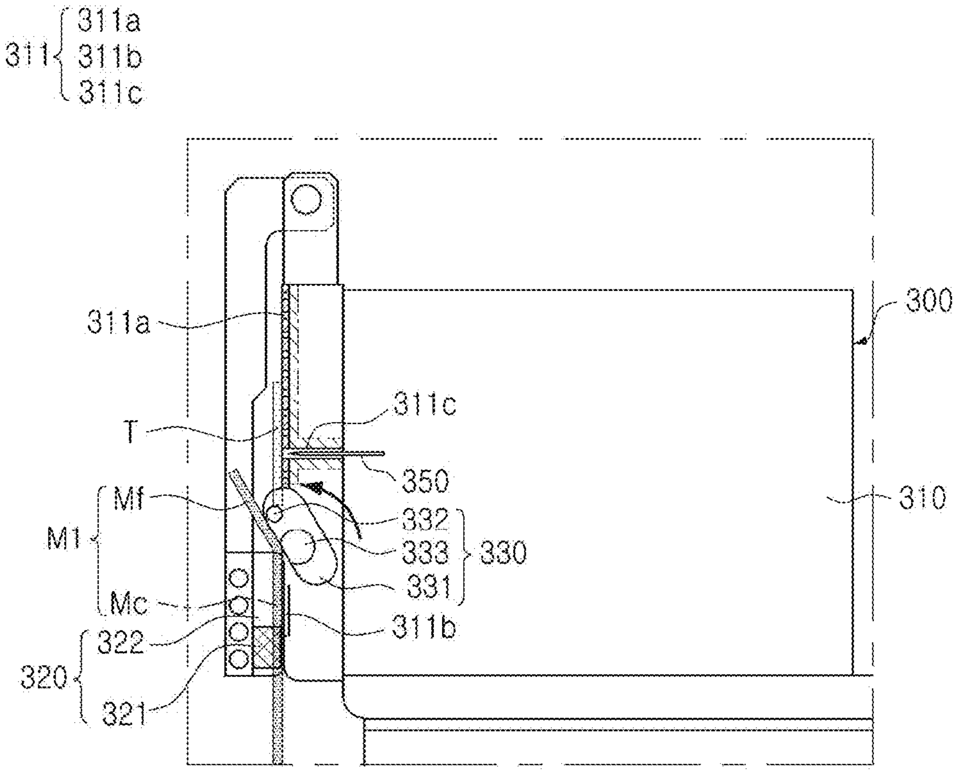
Figure 8:
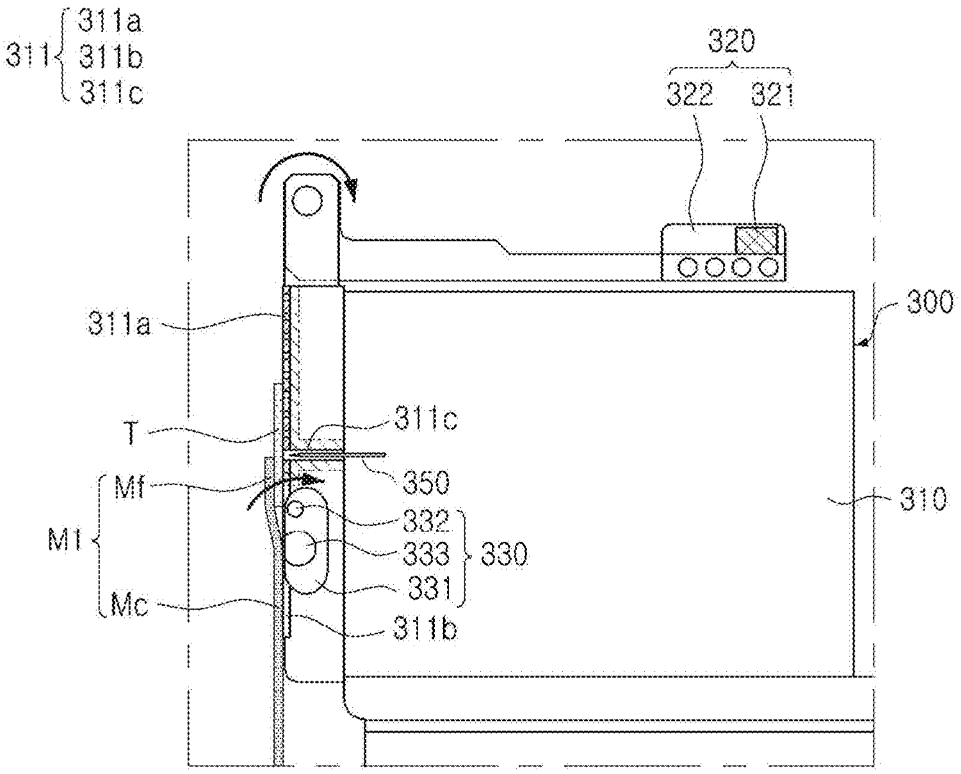

FIG. 7 is a side view illustrating a state in which the front end Mf of the first feed material M1 is separated from the front plate 311 in the material joint unit 300 provided in the first feed unit 200*a* in the process of connecting the front end Mf of the first feed material M1 to the end M3 of the second feed material M2 by the material joint unit 300 of the apparatus for automatically replacing the feed material M according to an exemplary embodiment in the present disclosure, and FIG. 8 is a side view illustrating a state in which adhesive tape T is disposed between the front end Mf of the first feed material M1 and the front plate 311 in the material joint unit 300 provided in the first feed unit 200*a* and the front end Mf of the first feed material M1 is attached to a portion of the adhesive tape T as the separator 330 is returned to its original position.

Referring to the drawings, the separator 330 of the apparatus for automatically replacing the feed material M according to an exemplary embodiment in the present disclosure may separate the front end Mf of the first feed material M1 from the front plate 311 so that a portion of the adhesive tape T is attached to an inner surface of the front end Mf of the first feed material M1 facing the front plate 311.

That is, as the separator 330 accommodated in the front plate 311 is rotated to protrude outwardly of the front plate 311, the first feed material M1 may also be separated from the front plate 311. To this end, the separator 330 may include a connection arm 331, a cross bar 332, and a rotating shaft 333.

The rotating shaft 333 may be disposed inside the front plate 311 and may be hinged to the front plate 311 to be rotated. In addition, the connection arm 331 is coupled to both end portions of the rotating shaft 333 and the cross bar 332. To this end, the connection arm 331 may be provided on both sides of the front plate 311. The cross bar 332 may be disposed in an accommodation recess formed on an outer surface of the front plate, and when the connection arm 331 rotates about the rotating shaft 333, the cross bar 332 may be moved to protrude outwardly of the front plate 311. A coupling shape of the connection arm 331, the cross bar 332, and the rotating shaft 333 may be, for example, a "c" shape lying with an open top or a "□" shape.

Figure 11:
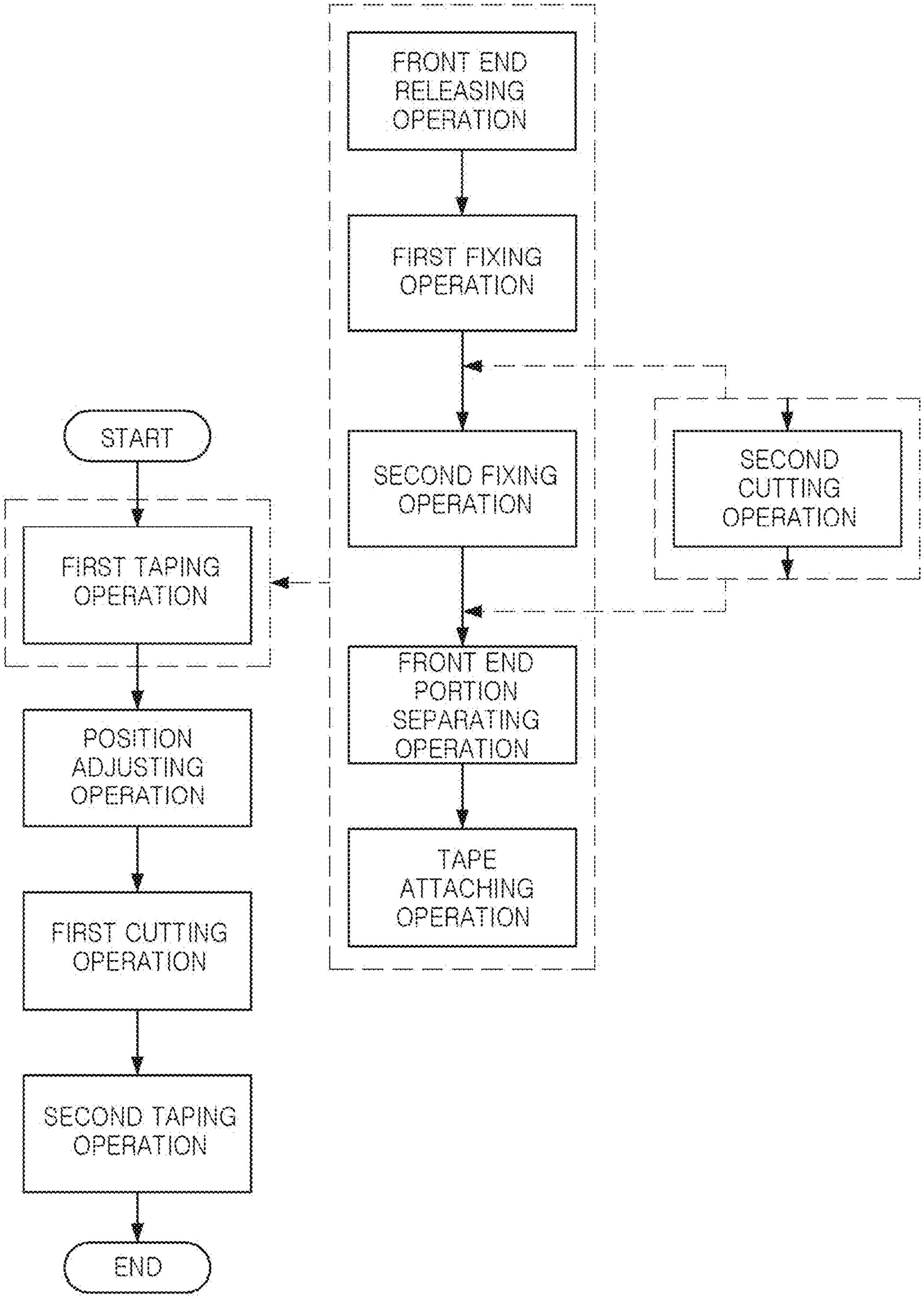
FIG. 11 is a flowchart illustrating an automatic replacement method according to an exemplary embodiment in the present disclosure.

FIG. 11 is a flowchart illustrating a method for automatically replacing the feed material M according to an exemplary embodiment in the present disclosure.

Referring to FIG. 11, the apparatus for automatically replacing the feed material M according to another exemplary embodiment in the present disclosure may include a first taping operation, a position adjusting operation, a first cutting operation, and a second taping operation. That is, these operations may be provided to connect the front end Mf of the first feed material M1 waiting in the first feed unit 200*a*, one of the pair of feed units 200, to the end M3 of the second feed material M2 being transferred to the discharge unit 100 from the second feed unit 200*b*, the other of the pair of feed units 200 in a butt joint manner.

The first taping operation is an operation of attaching a portion of the adhesive tape T to the front end Mf of the first feed material M1 waiting in the first feed unit 200*a*. That is, for a butt joint connection to the second feed material M2, first, the adhesive tape T is attached to the front end Mf of the first feed material M1.

To this end, the first taping operation of the method for automatically replacing the feed material M according to another exemplary embodiment in the present disclosure may include sub-operations such as a first fixing operation, a second fixing operation, a front end releasing operation, a front end separating operation, and a tape attaching operation.

In the first fixing operation, the first feed material M1 is disposed on the support block 310 of the first feed unit 200*a*, negative pressure is formed in the front plate 311 of the support block 310, and the front end Mf of the first feed material M1 is fixed. This may refer to FIG. 4 as an example.

In the second fixing operation, the clamp 320 of the first feed unit 200*a* is rotated to fix the connection portion Mc of the first feed material M1 adjacent to the front end Mf of the first feed material M1 to the front plate 311.

In the front end releasing operation, the negative pressure of the front plate 311 is released to release the fixing of the front end Mf of the first feed material M1.

The second fixing operation and the front end releasing operation may refer to FIG. 6 as an example. However, in the second fixing operation, the adsorption hole 311*a* of the front plate 311 forms negative pressure, and in the front end releasing operation, the adsorption hole 311*a* of the front plate 311 does not form negative pressure.

In the front end separating operation, a portion of the separator 330 of the first feed unit 200*a* is rotated outwardly to separate the front end Mf of the first feed material M1 from the front plate 311. This may refer to FIG. 7. Also, in the front end separating operation, the adhesive tape T may be disposed in a space between the front end Mf of the first feed material M1 and the front plate 311.

In the tape attaching operation, a portion of the adhesive tape T is attached to the inner surface of the front end Mf of the first feed material M1 facing the front plate 311. This may refer to FIG. 8 as an example. Also, in the tape attaching operation, the separator 330 is returned to its original position. Accordingly, the first feed material M1 separated from the front plate 311 may also be returned to its original position. That is, the first feed material M1 is returned to its original position by an elastic restoring force of the first feed material M1 to maintain its original shape. In addition, the front plate 311 may form negative pressure again so that the front end Mf of the first feed material M1 may be fixed to be in close contact with the adhesive tape T, and the clamp 320 may also be returned to its original position.

In addition, the first taping operation of the method for automatically replacing the feed material M according to another exemplary embodiment in the present disclosure may be performed after the first fixing operation or the second fixing operation and before the front end releasing operation, and may include a second cutting operation of cutting a portion of the front end Mf of the first feed material M1 to have a length to be connected to the end M3 of the second feed material M2 in a butt joint manner. This may refer to FIG. 5 as an example.

In the position adjusting operation, the first feed unit 200*a* is moved to be disposed in parallel to the second feed unit 200*b*. That is, after a portion of the adhesive tape T is attached to the front end Mf of the first feed material M1, the position of the first feed unit 200*a* is adjusted to attach the end M3 of the second feed material M2 to the other remaining portion of the adhesive tape T.

In the first cutting operation, the second feed material M2 being transferred to the discharge unit 100 from the second feed unit 200*b* is cut to form the end M3 of the second feed material M2. That is, the second feed material M2 wound on the feed roll 210 of the second feed unit 200*b* is cut at a position of the material joint unit 300 to form the end M3 of the feed material M such that the end M2 of the second feed material M2 is disposed at the position of the material joint unit 300.

In the second taping operation, the first feed unit 200*a* is moved in the direction toward the second feed unit 200*b* to attach the remaining portion of the adhesive tape T to the end Me of the second feed material M2, so that the first feed material M1 and the second feed material M2 are connected to each other in a butt joint manner. This may refer to FIG. 9 as an example.

Figure 12:
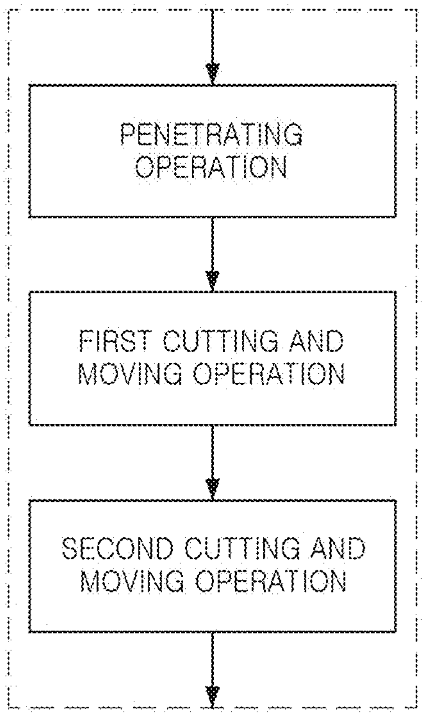
FIG. 12 is a flowchart illustrating a first cutting operation and a second cutting operation in the automatic replacement method according to an exemplary embodiment in the present disclosure.

FIG. 12 is a flowchart illustrating the first cutting operation and the second cutting operation in the method for automatically replacing the feed material M according to an exemplary embodiment in the present disclosure.

Referring to FIG. 12, at least one of the first cutting operation and the second cutting operation of the method for automatically replacing the feed material M according to another exemplary embodiment in the present disclosure may include a penetrating operation, a first cutting and moving operation, and a second cutting and moving operation.

The penetrating operation is an operation in which the cutter 350 penetrates through the central portion of the feed material M. This may refer to FIG. 10A.

The first cutting and moving operation is an operation of moving the cutter 350 to one end of the feed material M, in a state in which the cutter 350 penetrates through the feed material M. This may refer to FIG. 10B as an example.

The second cutting and moving operation is an operation of moving the cutter 350 from one end of the feed material M to the other end thereof, in a state in which the cutter 350 penetrates through the feed material M. This may refer to FIG. 10C as an example.

Figure 10A:
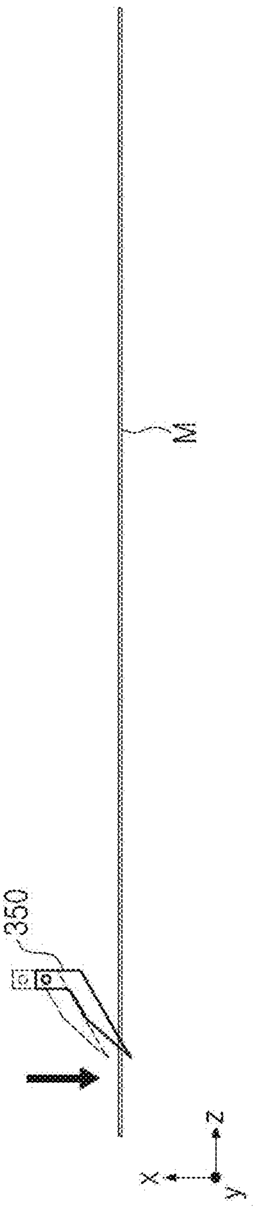
FIG. 10A to 10D are plan views illustrating a process in which a feed material is cut by a cutter of an automatic replacement apparatus according to an exemplary embodiment in the present disclosure.
Figure 10B:
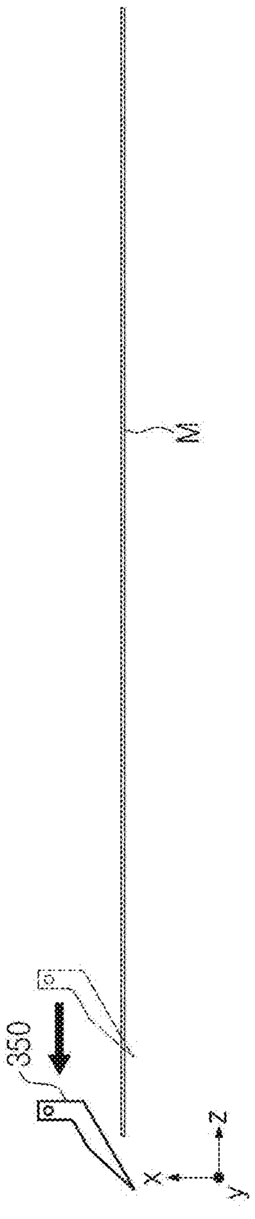
Figure 10C:
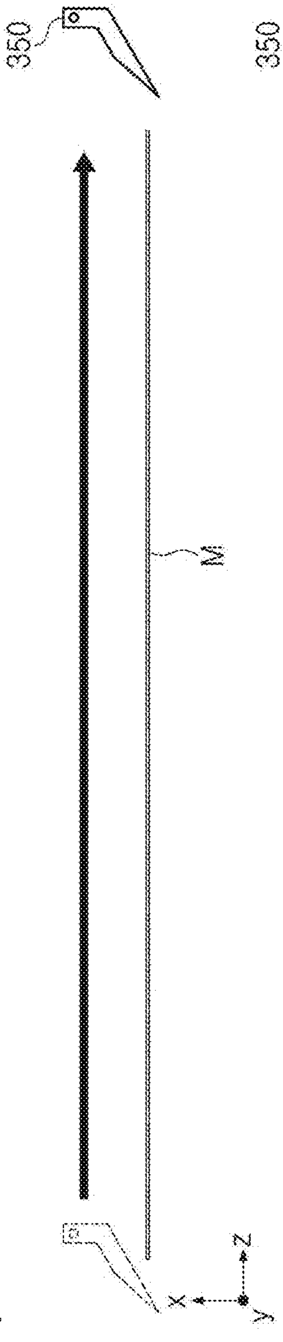
Figure 10D:
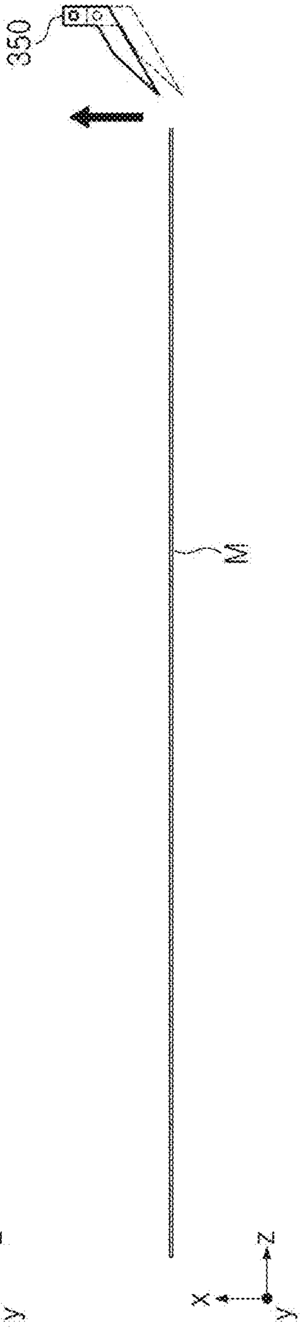

FIG. 10D illustrates a state in which the cutter 350 is removed from the feed material M.

In this manner, by cutting the feed material M in the penetrating operation, the first cutting and moving operation, and the second cutting and moving operation, a problem that the end portion of the feed material M is pushed or wrinkled may be improved.

That is, when the cutter 350 cuts the feed material M, while moving from one end to the other end of the feed material M, without the penetrating operation, one end of the feed material M may not be cut due to frictional contact between the cutter 350 and one end of the feed material M but may be pushed to one side or wrinkled. However, since the present disclosure includes the penetrating operation, the first cutting and moving operation, and the second cutting and moving operation, such a problem may be improved.

As set forth above, the apparatus and method for automatically replacing the feed material M of the present disclosure have the advantage of automatically replacing the feed roll supplying a feed material such as an electrode material.

In another aspect, the apparatus and method for automatically replacing the feed material M of the present disclosure have the advantage of replacing the feed roll, while minimizing loss of a feed material.

While example exemplary embodiments have been shown and described above, it will be apparent to those skilled in the art that modifications and variations could be made without departing from the scope of the present disclosure as defined by the appended claims.

What is claimed is:

1. An automatic replacement apparatus for a feed material, the automatic replacement apparatus comprising:
- a discharge unit configured to discharge a feed material to the outside;
- a pair of feed units having a feed roll around which the feed material is wound; and
- a pair of material joint units respectively provided in the pair of feed units configured to connect a front end of a first feed material and an end of a second feed material in a butt joint manner, wherein the material joint unit includes:
- a support block including a front plate allowing the feed material to be disposed thereon;
- a clamp coupled to the front plate, and configured to be fixed to the other end of the front plate; and
- a separator accommodated in the front plate and separating a front end of the first feed material from the front plate.

2. The automatic replacement apparatus of claim 1, wherein the support block has a plurality of adsorption holes forming negative pressure, and wherein the plurality of adsorption holes include:
- an upper adsorption hole provided at an upper end portion of the front plate;
- a central adsorption hole provided at a central portion of the front plate; and
- a lower adsorption hole provided at a lower end portion of the front plate.

3. The automatic replacement apparatus of claim 1, wherein one end of the separator being hinged to a central portion of the front plate and the other end of the separator configured to rotate in an outward direction to protrude from the front plate.

4. The automatic replacement apparatus of claim 3, wherein the material joint unit includes a transporter associated with the support block, and moving the support block in a direction toward the second feed material.

5. The automatic replacement apparatus of claim 1, wherein the front plate includes a first buffer pad provided on an outer surface in contact with the feed material.

6. The automatic replacement apparatus of claim 1, wherein the clamp includes a stationary magnet and is coupled to the front plate formed of a metal material by magnetic force.

7. The automatic replacement apparatus of claim 6, wherein the clamp includes a second buffer pad surrounding the stationary magnet.

8. The automatic replacement apparatus of claim 1, wherein the clamp allows the separator to pass through the clamp so that a portion of the feed material is spaced apart from the front plate.

9. The automatic replacement apparatus of claim 1, wherein the separator includes:
- a rotating shaft disposed inside the front plate and hinged to the front plate to be rotated;
- a connection arm coupled to the rotating shaft; and
- a cross bar disposed in an accommodation recess formed on an outer surface of the front plate, and structured to move to protrude outwardly of the front plate when the connection arm rotates about the rotating shaft,
- wherein the connection is coupled to end portions of the rotating shaft and end portions of a cross bar.

10. The automatic replacement apparatus of claim 1, wherein the material joint unit includes a cutter passing through a hole formed in the front plate, moving in a width direction of the feed material, and cutting the feed material.

11. The automatic replacement apparatus of claim 1, wherein the feed unit includes:
- a support frame allowing the feed roll to be coupled thereto; and
- a position adjuster allowing the support frame to be coupled thereto and rotatably moving the support frame.

12. The automatic replacement apparatus of claim 11, wherein the position adjuster includes:
- a rotating pole coupled to a lower end portion of the support frame; and
- a rotation driving portion for rotating the rotating pole.

13. An automatic replacement method for a feed material, the automatic replacement method comprising:
- a first taping operation of attaching a portion of adhesive tape to a front end of a first feed material waiting in a first feed unit; and
- a second taping operation of attaching the other remaining portion of the adhesive tape to the end of a second feed material so that the first feed material and the second feed material are connected to each other in a butt joint manner,
- wherein the first taping operation includes:

a first fixing operation of disposing the first feed material on a support block of the first feed unit and fixing a front end of the first feed material;

a second fixing operation of fixing a connection portion of the first feed material adjacent to a front end of the first feed material to the front plate;

a front end releasing operation of releasing the fixed front end of the first feed material;

a front end separating operation of separating the front end of the first feed material from the front; and a tape attaching operation of attaching a portion of adhesive tape to an inner surface of the front end of the first feed material facing the front plate.

14. The automatic replacement method of claim 13, further comprising:

a position adjusting operation of moving the first feed unit to be disposed in parallel to a second feed unit; and a first cutting operation of cutting the second feed material being transferred from the second feed unit to a discharge unit to form an end of the second feed material.

15. The automatic replacement method of claim 13, wherein the first taping operation includes a second cutting operation of cutting a portion of the front end of the first feed material to have a length butt-joining an end of the second feed material, the second cutting operation being performed after the first fixing operation or the second fixing operation and before the front end releasing operation.

16. The automatic replacement method of claim 15, wherein at least one of the first cutting operation and the second cutting operation includes:

a penetrating operation in which the cutter penetrates the feed material;

a first cutting and moving operation in which the cutter, in a state of penetrating through the feed material, is moved to one end of the feed material; and a second cutting and moving operation in which the cutter, in a state of penetrating through the feed material, is moved from one end of the feed material to the other end of the feed material.

* * * * *